United States Patent [19]

Speece

[11] 4,251,365
[45] Feb. 17, 1981

[54] LOW ENERGY GAS TRANSFER SYSTEM

[76] Inventor: Richard E. Speece, 472 Sharon Dr., Wayne, Pa. 19087

[21] Appl. No.: 29,972

[22] Filed: Apr. 13, 1979

[51] Int. Cl.³ .......................... C02F 1/74; B01D 19/00
[52] U.S. Cl. .................................. 261/121 R; 55/52; 210/109; 210/136; 210/138; 210/188; 210/195.1; 210/220; 406/106; 137/1; 137/896
[58] Field of Search .......................... 55/48, 51–53, 55/160, 196; 210/60, 61, 63 R, 188, 220, 221 R, 109, 136, 138, 195.1; 261/36 R

[56] References Cited

U.S. PATENT DOCUMENTS

| | | | |
|---|---|---|---|
| 1,047,534 | 12/1912 | Joseph | 210/188 |
| 1,808,956 | 6/1931 | Ketterer | 261/36 R X |
| 3,017,951 | 1/1962 | Wiley | 55/52 |
| 3,097,917 | 7/1963 | Dotts, Jr. et al. | 55/48 |
| 3,248,855 | 5/1966 | Hartmann | 55/48 X |
| 3,555,783 | 1/1971 | Grimshaw | 55/48 |
| 3,815,330 | 6/1974 | Lawley | 55/196 X |
| 3,926,588 | 12/1975 | Speece | 55/52 |
| 4,087,262 | 5/1978 | Speece | 55/52 |
| 4,093,544 | 6/1978 | Ross | 55/160 X |
| 4,133,767 | 1/1979 | Bakalyar et al. | 55/53 X |

*Primary Examiner*—Robert H. Spitzer
*Attorney, Agent, or Firm*—Clarence A. O'Brien; Harvey B. Jacobson

[57] ABSTRACT

Liquid is collected and gasified within the same pressure sealed chamber from which it is displaced. The liquid is gasified toward saturation under a high pressure for a limited time by recirculation of the gas through the chamber. Flow control valves establish a closed circuit through which recirculation occurs while the chamber is maintained pressurized as well as to effect displacement of gas saturated liquid from the chamber during spaced intervals of time while the chamber is depressurized.

13 Claims, 3 Drawing Figures

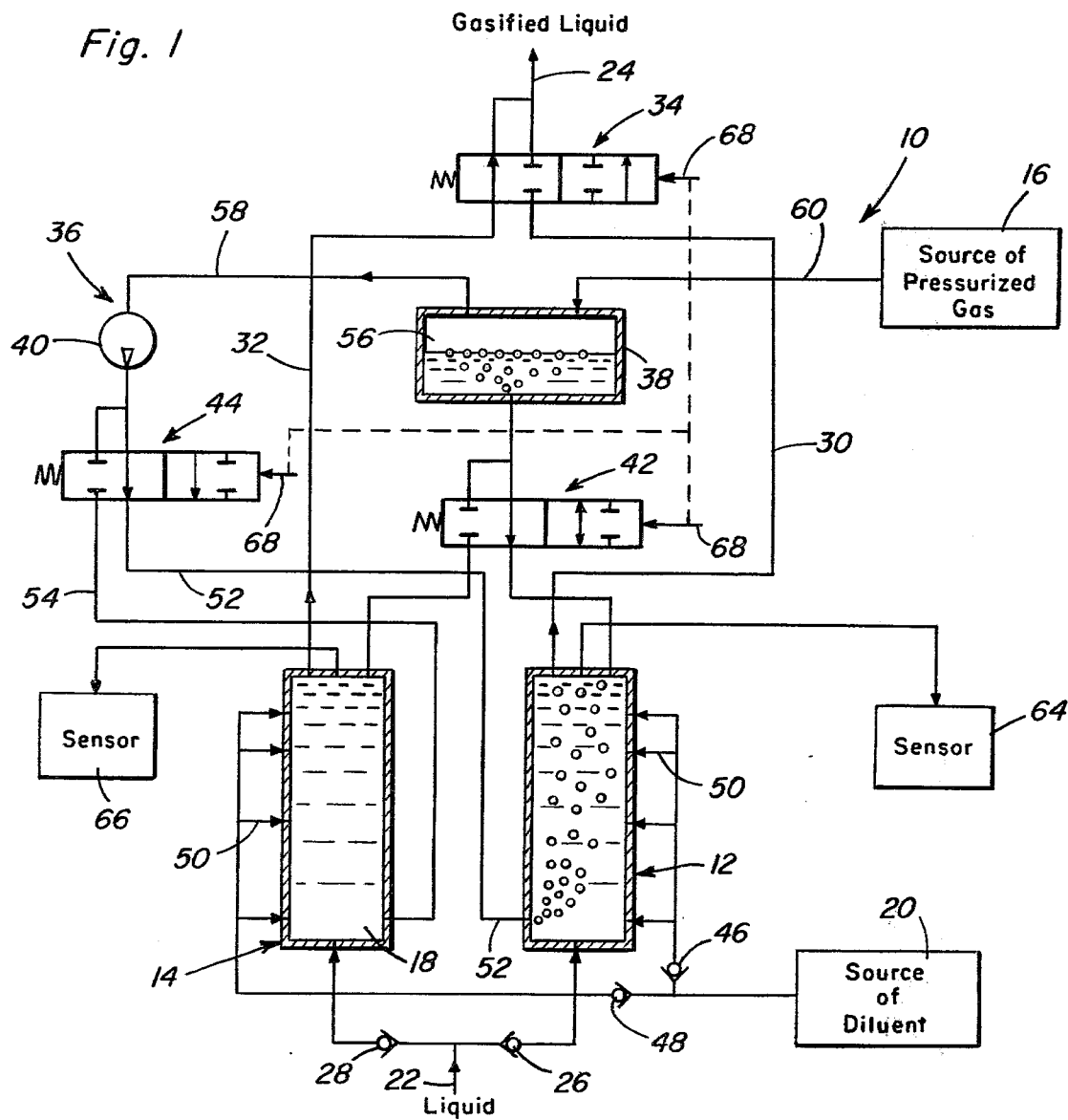
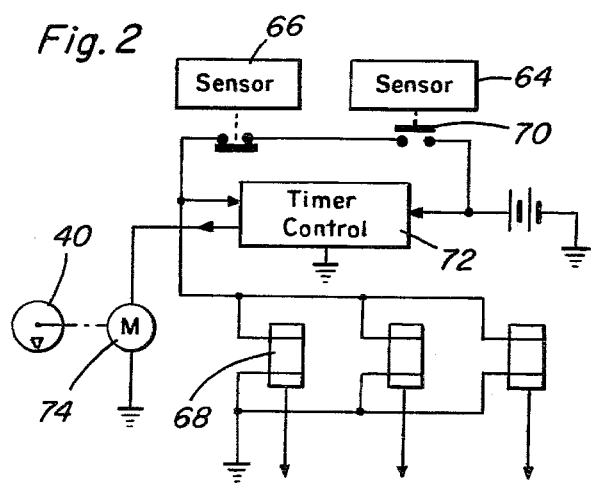
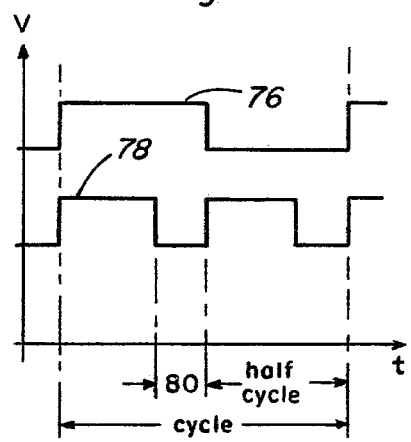

LOW ENERGY GAS TRANSFER SYSTEM

BACKGROUND OF THE INVENTION

This invention relates to the transfer of compressible fluid or gas such as oxygen or hydrogen to a relatively incompressible fluent material or liquid such as water or a coal slurry and is an improvement over the gas transfer systems disclosed in my prior U.S. Pat. Nos. 3,926,588 and 4,087,262.

According to my prior U.S. Pat. No. 3,926,588, gas is injected into a liquid within a gas transfer device and the gasified liquid is collected within a separate plug-flow chamber by recirculation between the chamber and the gas transfer device until the liquid is saturated. Recirculation occurs under a relatively high pressure for a limited period of time through a closed loop. The saturated liquid collected within the plug-flow chamber is then displaced therefrom by the inflow of the liquid under a low pressure. Two chambers are utilized so that the high circulating pressure may be maintained continuous even though it is only applied intermittently to each individual chamber. In order to avoid effervescence, a diluent is introduced into each chamber when depressurized according to my prior U.S. Pat. No. 4,087,262.

In view of the use of a separate gas transfer device in association with the plug-flow chambers as disclosed in my prior U.S. patents aforementioned, flow losses occur because of the necessary connecting conduits. Also, considerable equipment cost is involved. It is therefore an important object of the present invention to provide an improved gas transfer system which will reduce the cost of equipment and fluid losses inherent in the systems disclosed in my aforementioned prior U.S. patents.

SUMMARY OF THE INVENTION

In accordance with the present invention, the same pressure sealed chamber is utilized for injecting the gas, gasifying the liquid toward saturation, and diluting if necessary, the gasified liquid to prevent effervescence. A separate and costly gasifier is thereby avoided and energy requirements reduced. A more efficient system is also realized because of the reduction in the length of piping and the accompanying decrease in fluid losses.

As in the case of the systems disclosed in my prior U.S. patents aforementioned, the present invention may be practiced by use of two pressure sealed chambers connected to a conduit through which a liquid flows under a relatively low pressure, whereby a predetermined quantity of liquid may be collected within each chamber and alternately displaced from each chamber under the low pressure. Saturation of the liquid with gas is effected in each chamber by recirculation of the gas during a limited period of time under a high pressure. Since the transfer of the gas occurs within the same chamber in accordance with the present invention, a separate gasifier is avoided. Dilution of the saturated liquid within the same chamber in order to avoid effervescence is also effected. Toward that end, each pressure sealed chamber is depressured by opening of a selectively controlled outlet valve operative to effect displacement of liquid from the chamber under the inflow of low pressure liquid. Upon closing of the outlet valve, the chamber is pressurized and then connected through other valving to a closed fluid circuit for flow recirculation under the high pressure.

In order to effectively inject the gas into the liquid, a surge tank is interconnected in the closed fluid circuit between the high pressure circulating pump and the chamber. During the recirculation phase of each cycle, some liquid is displaced by the pressurized gas into the surge tank. The surge tank permits separation of free gas from the liquid for recirculation of the free gas with additional gas from the source replenishing the gas absorbed by the liquid in the chamber. The recirculation phase of the cycle is terminated before the chamber is depressured in order to permit a non-forced fluid exchange between the surge tank and the chamber whereby liquid in the surge tank drains back into the chamber. As soon as all of the excess gas in the chamber is withdrawn and replaced by exchange with liquid, this condition is detected by a sensor and the chamber is depressurized by opening of the outlet valve causing displacement of the gasified liquid under the low liquid pressure. At the same time, the closed, recirculation circuit is switched from the depressurized chamber to the other chamber of the system which simultaneously undergoes a gasification phase under the high recirculating pressure. In response to depressurization of each chamber to begin a low pressure displacement phase of operation, a diluent is introduced into the chamber in order to prevent effervescence.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is schematic fluid circuit diagram depicting the system of the present invention.

FIG. 2 is simplified electrical circuit diagram illustrating the controls associated with the system illustrated in FIG. 1.

FIG. 3 is a graphical illustration of valve and pump operating characteristics of the system.

DETAILED DESCRIPTION OF A SPECIFIC EMBODIMENT

Referring now to the drawings in detail, FIG. 1 illustrates a gas transfer system generally denoted by reference numeral 10, which is based upon the use of two vertically elongated chambers 12 and 14 enclosing pressure sealed zones within which all operational phases of the system occur including injection of gas from a source 16 into a collected body of liquid 18, gasification of the liquid, and dilution of the gasified liquid from a source of diluent 20. Liquid such as water may be gasified with oxygen from source 16, for example, by the system of the present invention to which the liquid is introduced through an inlet conduit section 22 under a relatively low pressure. The gasified liquid is delivered by the system to an outlet conduit section 24.

Liquid is conducted to each of the pressure sealed zones within chambers 12 and 14 and displaced therefrom by means of a flow control arrangement including a pair of one-way check valves 26 and 28 respectively connecting inlet conduit section 22 to the lower ends of each of the chambers 12 and 14. The upper ends of the chambers are respectively connected through lines 30 and 32 to the outlet conduit section 24 by means of a selectively controlled outlet valve 34. In the position of the outlet valve 34 shown in FIG. 1, chamber 14 is connected to the outlet conduit section 24 and is therefore depressurized so that the liquid 18 therein may be displaced by an inflow of liquid through one-way check valve 28. Since outflow from chamber 12 is then blocked by the outlet valve 34, chamber 12 will be pressurized and inflow through one-way check valve 26 will be blocked.

The source of pressurized gas 16 is connected to the system through a closed fluid circuit generally referred to by reference numeral 36 which includes a surge tank 38 and a high pressure recirculating pump 40. Also associated with the closed circuit 36, is a fluid exchange valve 42 interconnecting the surge tank 38 with the pressure sealed chambers 12 and 14 and a gas injection valve 44 innerconnecting the outlet of the pump 40 with the pressure sealed chamber 12 and 14 adjacent their lower ends. Diluent from source 20 is conducted to each of the chambers 12 and 14 through one-way check valves 46 and 48 and is injected into the chambers through distributed inlet ports 50 as disclosed in my prior U.S. Pat. No. 4,087,262.

In the position of the gas injection valve 44 shown in FIG. 1, gas under pressure is supplied by pump 40 from the surge tank 38 to chamber 12 through pump outlet line 52 in order to effect gasification of the liquid in chamber 12. The other outlet line 54 from the gas injection valve 44 to chamber 14, is blocked so that recirculation flow is confined to chamber 12, which is then pressurized because of the blockage of outlet line 30 by the outlet valve 34. Fluid exchange between chamber 12 or 14 and the surge tank 38 is controlled by valve 42. In the position of valve 42 shown in FIG. 1, fluid exchange occurs between the chamber 12 and the surge tank while fluid exchange between the chamber 14 and the surge tank is blocked. Accordingly, liquid displaced from chamber 12 by the pressure of the gas being injected may enter the surge tank within which free gas separates from the liquid bubbling into the gas space 56. Gas is withdrawn from the gas space of the surge tank by the pump 40 through line 58 while gas to replenish the gas absorbed by the liquid is supplied from the source 16 through line 60. During the gasification phase of operation, gas bubbles will accumulate in chamber 12. This excess gas is exchanged with the liquid stored in the surge tank at the end of the gasification phase. Termination of the gasification cycle is thereby detected by gas sensor 64 or 66 connected to the upper ends of the chambers 12 and 14. The sensors may thereby control operation of the system in order to obtain the desired degree of liquid gasification or gas saturation.

As shown by way of example in FIG. 2, a simplified control arrangement including the sensors 64 and 66 is operative in effecting simultaneous actuation of the valves 34, 42 and 44 by means of solenoid actuators 68. The valves are accordingly actuated by closing of a sensor switch 70 when sensor 64 detects the end of a gasification phase with respect to chamber 12. At the same time, operation of pump 40 is initiated through a timer control circuit 72 energizing pump motor 74. Through the timer control circuit 72, the pump 40 is operated for a limited period of time sufficient to effect gas saturation of the liquid in the chamber to which it is connected by valve 44. Operation of the pump is terminated by de-energization of the pump motor 74 before the end of a gasification phase in order to permit non-forced fluid exchange between the surge tank and the chamber through valve 42 for a short interval of time. During this short interval, liquid drains back into the chamber from the surge tank to and replace the excess gas.

The relationship between pump operation and valve actuation is graphically depicted in FIG. 3 which shows energization of the valve actuators 68 during one-half of each cycle as depicted by curve 76. During each half cycle, the pump motor is also energized as depicted by curve 78 in FIG. 3. The pump motor is, however, energized for less than the duration of each half cycle so as to establish a short exchange interval 80 as depicted in FIG. 3 during which the non-forced fluid exchange occurs between the surge tank and the chamber to which it is connected. Each half cycle is begun by the simultaneously shifting of all of the valves 34, 42 and 44 so as to switch the connections between the chambers 12 and 14 and the surge tank 38 and pump 40.

Summarizing operation of the system, in the position of the valves shown in FIG. 1, liquid is conducted through check valve 28 to displace previously gasified liquid from chamber 14, through valve 34 to outlet conduit 24. During this phase of operation, liquid is simultaneously being gasified within chamber 12 by the supply of gas from pump 40 under a relatively high pressure through line 52. Chamber 12 is then in fluid communication with the surge tank through valve 42 so that some of the liquid will be displaced by gas pressure into the surge tank. Before the end of the half cycle, determined by the timer control 72, operation of the pump 40 is discontinued so that liquid in the surge tank 38 may drain back into the chamber 12 and excess gas in chamber 12 may rise and bubble through any liquid remaining in the surge tank. As soon as the excess gas has been withdrawn from the chamber 12, this condition is detected by the sensor 64 to begin a new half cycle. Sensor 64 thus closes sensor switch 70, as shown by way of example in FIG. 2, in order to energize the valve actuators causing simultaneous shift of the valves 34, 42 and 44 to their other operative positions. Chamber 12 will then be depressurized by connection through line 30 and valve 34 to the outlet conduit section 24 resulting in displacement of the gasified liquid therefrom by the inflow of liquid through one-way check valve 26. At the same time, the pump motor 74 is energized through timer control circuit 72 so that operation of the pump 40 is resumed in order to begin a new gasification phase with respect to the chamber 14. Gasification occurs within chamber 14 in the same manner as hereinbefore described with respect to chamber 12. Operation of the pump 40 is discontinued under control of the timer circuit 72 as aforementioned to permit fluid exchange between chamber 14 and surge tank 38 until the end of the half cycle is detected by sensor 66. Sensor 66 will then deenergize the valve actuators by opening sensor switch 76 in order to initiate a new operational cycle by return of all of the valves to the positions shown in FIG. 1. The check valves 46 and 48 respond to depressurization of associated chambers 12 and 14 in order to conduct an inflow of diluent from source 20 for preventing effervescence if necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a source of compressible fluid, apparatus for transferring said fluid to a relatively incompressible fluent material flowing in a conduit under a first pressure, including at least one chamber device connected to the conduit within which said fluent material is saturated with said fluid under a second and different pressure, flow control means connecting said chamber device to the conduit for displacing saturated fluent material completely filling the chamber during spaced intervals of time under said first pressure of the fluent material in said conduit, pump means inducing flow of the fluid alone for injecting the fluid into the fluent material within the chamber device under said second pressure, closed circuit means connecting the pump means to the chamber device for recirculating the fluid therethrough under said second pressure, and means for limiting said recirculation of the fluid to periods between said spaced intervals of time.

2. The combination of claim 1 wherein said closed circuit means include a surge tank interconnected between said source of fluid and the pump means and control valve means interconnecting said chamber device with the surge tank and the pump means for transfer of excess fluid from the chamber device to and replacement thereof with liquid from the surge tank.

3. The combination of claim 2 wherein said recirculation limiting means includes sensing means connected to said chamber device for initiating operation of the pump means in response to completion of said transfer of excess fluid from the chamber device to the surge tank, and timer means for terminating operation of the pump means prior to said displacement of the saturated fluent material from the chamber device to enable non-forced flow exchange between the surge tank and the chamber device during which the excess fluid is transferred.

4. The combination of claim 3 wherein said flow control means includes one-way valve means for conducting the fluent material from the conduit into the chamber device when depressurized, and selectively controlled outlet means for conducting the saturated fluent material from the chamber device causing depressurization thereof.

5. The combination of claim 4 including a second chamber device connected to the flow control means and the closed circuit means for recirculation of fluid therethrough simultaneously with said displacement of saturated fluid material from the first mentioned chamber device and displacement of saturated fluent material therefrom simultaneously with said recirculation of fluid through the first mentioned chamber device.

6. The combination of claim 1 wherein said flow control means includes one-way valve means for conducting the fluent material from the conduit into the chamber device when depressurized, and selectively controlled outlet means for conducting the saturated fluent material from the chamber device causing depressurization thereof.

7. In combination with a source of gas, and a conduit conducting liquid under a relatively low pressure, apparatus for gasifying the liquid including pressure sealed means enclosing a chamber within which the liquid is gasified, flow control means connected to the pressure sealed means for connecting the chamber to the conduit to displace the gasified liquid therefrom under said low pressure, pump means connected to said source for injecting the gas alone into said chamber under a relatively high pressure, closed circuit means connecting the pump means to the pressure sealed means for recirculating the gas through the chamber under said relatively high pressure to gasify the liquid therein, operational control means connected to the closed circuit means and the flow control means for alternately effecting said gasification of the liquid under the high pressure within and displacement of the gasified liquid under the low pressure from the chamber, and means for limiting operation of the pump means to discontinue recirculation of the gas for a short interval before displacement of the gasified liquid from the chamber occurs.

8. The combination of claim 7 including a surge tank, and valve means interconnecting the surge tank in said closed circuit means for fluid exchange of the free gas and liquid between the chamber and the surge tank during said short interval.

9. The combination of claim 8 wherein said source includes a surge tank connected to the pump means and the valve means, and means for supplying pressurized gas to the surge tank to replenish gas absorbed by the liquid.

10. In combination with a conduit through which a fluent material is conducted under a first pressure, fluid transfer apparatus including pressure sealed means enclosing a chamber within which said fluent material is collected, flow control means connecting the pressure sealed means to the conduit for displacing the collected fluent material from the chamber under said first pressure during spaced intervals of time, pump means for inducing flow of fluid under a second pressure different from the first pressure, recirculating conduit means connecting the pump means to the pressure sealed means for directing said flow induced by the pump means through the chamber between said spaced intervals of time, and flow exchange means connected to the recirculating conduit means for replacing any free fluid in the chamber with fluent material before said displacement of the collected fluent material under the first pressure.

11. The apparatus as defined in claim 10 wherein said flow exchange means includes a surge tank within which the free fluid collects, valve means interconnecting the surge tank and the chamber for conducting the free fluid and the fluent material in opposite directions until the free fluid is completely replaced within the chamber, and sensor means connected to the pressure sealed means for detecting the absence of the free fluid in the chamber.

12. A method of gasifying a liquid flowing under a relatively low pressure with a gas under a relatively high pressure, including the steps of: collecting a predetermined quantity of said liquid within a pressure sealed zone; injecting said gas into the same zone for absorption by the liquid; recirculating said gas through said zone under said high pressure for a limited period of time; maintaining said zone pressurized for a short interval of time upon termination of said recirculation of the gas; replacing any free gas in said zone with liquid during said short interval of time; depressurizing the zone; and displacing the gasified liquid from said depressurized zone under the low pressure of the liquid.

13. The method of claim 12 wherein the step of replacing the free gas includes: conducting liquid displaced by the gas under the high pressure from said zone into a surge chamber; and draining the liquid from said surge chamber back into the zone during said short interval of time.

* * * * *